(12) United States Patent
Komninakis et al.

(10) Patent No.: US 8,918,062 B2
(45) Date of Patent: Dec. 23, 2014

(54) COMBINED INTELLIGENT RECEIVE DIVERSITY (IRD) AND MOBILE TRANSMIT DIVERSITY (MTD) WITH INDEPENDENT ANTENNA SWITCHING FOR UPLINK AND DOWNLINK

(75) Inventors: Christos Komninakis, La Jolla, CA (US); Daniel F. Filipovic, Solana Beach, CA (US); Chengjin Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 454 days.

(21) Appl. No.: 12/962,513

(22) Filed: Dec. 7, 2010

(65) Prior Publication Data

US 2011/0136446 A1    Jun. 9, 2011

Related U.S. Application Data

(60) Provisional application No. 61/267,650, filed on Dec. 8, 2009, provisional application No. 61/297,363, filed on Jan. 22, 2010.

(51) Int. Cl.
| | | |
|---|---|---|
| H04B 1/44 | (2006.01) | |
| H04B 7/08 | (2006.01) | |
| H04B 7/06 | (2006.01) | |

(52) U.S. Cl.
CPC ............ *H04B 7/0691* (2013.01); *H04B 7/0814* (2013.01); *H04B 7/0888* (2013.01); *H04B 7/0874* (2013.01); *H04B 7/0608* (2013.01); *H04B 7/0831* (2013.01)
USPC .......... 455/78; 455/442; 455/560; 455/277.1; 455/73; 455/11.1; 455/226.3; 455/272; 455/552.1; 455/562.1; 343/711; 343/718; 343/820; 343/822; 370/260

(58) Field of Classification Search
USPC ............ 455/442, 560, 277.1, 73, 11.1, 226.3, 455/272, 552.1, 80, 562.1; 343/711, 718, 343/820, 822; 370/260
See application file for complete search history.

(56) References Cited

U.S. PATENT DOCUMENTS

| | | | |
|---|---|---|---|
| 7,096,000 B2 | 8/2006 | Yano | |
| 7,826,459 B2 | 11/2010 | Xhafa et al. | |

(Continued)

FOREIGN PATENT DOCUMENTS

| | | |
|---|---|---|
| CN | 101072413 A | 11/2007 |
| CN | 101483281 A | 7/2009 |

(Continued)

OTHER PUBLICATIONS

International Search Report and Written Opinion—PCT/US2010/059456—ISA/EPO—Apr. 12, 2011.

(Continued)

*Primary Examiner* — April G Gonzales
(74) *Attorney, Agent, or Firm* — Kenyon S. Jenckes

(57) ABSTRACT

Methods and apparatus are provided for allowing a transmitter (Tx) to perform antenna selection independently of a receiver (Rx) in a transceiver supporting both transmit diversity and receive diversity. Certain aspects may utilize a cross switch, which may be used in a parallel or cross configuration, to provide for the independent antenna selection, such that the Rx may maintain the ability to operate on the same antenna as the Tx, on another antenna, or on both antennas for enhanced receive diversity. Furthermore, certain aspects may employ additional switching in the baseband domain in an effort to avoid, or at least reduce, switching glitches in the Rx caused by changing the cross switch configuration. In this manner, the Rx need not re-converge upon antenna switching.

64 Claims, 13 Drawing Sheets

(56) References Cited

U.S. PATENT DOCUMENTS

| | | | |
|---|---|---|---|
| 8,064,861 B2* | 11/2011 | Ruijter | 455/277.1 |
| 8,200,168 B2* | 6/2012 | Rofougaran et al. | 455/80 |
| 8,248,970 B2* | 8/2012 | Abramov et al. | 370/260 |
| 8,570,231 B2 | 10/2013 | Desclos et al. | |
| 2003/0171118 A1* | 9/2003 | Miya | 455/442 |
| 2003/0176176 A1* | 9/2003 | Leinonen et al. | 455/277.1 |
| 2004/0248523 A1 | 12/2004 | Nishimura et al. | |
| 2005/0148370 A1 | 7/2005 | Moldoveanu et al. | |
| 2006/0197538 A1 | 9/2006 | Leinonen et al. | |
| 2006/0292986 A1 | 12/2006 | Bitran et al. | |
| 2007/0066228 A1 | 3/2007 | Leinonen et al. | |
| 2007/0178839 A1 | 8/2007 | Rezvani et al. | |
| 2007/0243822 A1 | 10/2007 | Monte et al. | |
| 2007/0243832 A1* | 10/2007 | Park et al. | 455/73 |
| 2008/0057862 A1* | 3/2008 | Smith | 455/11.1 |
| 2008/0106476 A1 | 5/2008 | Tran et al. | |
| 2008/0200195 A1 | 8/2008 | Abe et al. | |
| 2008/0242232 A1 | 10/2008 | Zavadsky et al. | |
| 2008/0261647 A1 | 10/2008 | Hamada | |
| 2009/0015475 A1 | 1/2009 | Fujishiro | |
| 2009/0061791 A1 | 3/2009 | Matsubara | |
| 2009/0196371 A1 | 8/2009 | Yamamoto et al. | |
| 2009/0231220 A1 | 9/2009 | Zhang et al. | |
| 2009/0258622 A1* | 10/2009 | Ruijter | 455/226.3 |
| 2009/0323652 A1 | 12/2009 | Chen et al. | |
| 2010/0029215 A1 | 2/2010 | Honkanen et al. | |
| 2010/0093385 A1 | 4/2010 | Kazmi et al. | |
| 2010/0304685 A1 | 12/2010 | Wietfeldt et al. | |
| 2010/0304770 A1 | 12/2010 | Wietfeldt et al. | |
| 2011/0021244 A1* | 1/2011 | Karaoguz et al. | 455/552.1 |
| 2011/0149764 A1 | 6/2011 | Wietfeldt et al. | |
| 2011/0249576 A1 | 10/2011 | Chrisikos et al. | |
| 2011/0249760 A1 | 10/2011 | Chrisikos et al. | |
| 2011/0250926 A1 | 10/2011 | Wietfeldt et al. | |
| 2012/0163317 A1 | 6/2012 | Yu et al. | |
| 2013/0053013 A1 | 2/2013 | Giaretta et al. | |

FOREIGN PATENT DOCUMENTS

| | | |
|---|---|---|
| CN | 101499841 A | 8/2009 |
| DE | 102008016873 A1 | 4/2009 |
| EP | 0364190 A2 | 4/1990 |
| EP | 1976131 A1 | 10/2008 |
| EP | 2015467 A2 | 1/2009 |
| GB | 2320816 | 7/1998 |
| JP | H06284062 A | 10/1994 |
| JP | 2007311994 A | 11/2007 |
| JP | 2011023851 A | 2/2011 |
| WO | 2007060734 A1 | 5/2007 |
| WO | 2009118049 A1 | 10/2009 |

OTHER PUBLICATIONS

Goldsmith, Andrea, Wireless Communications, 2005, pp. 496-497, Cambridge University Press, New York, NY.

* cited by examiner

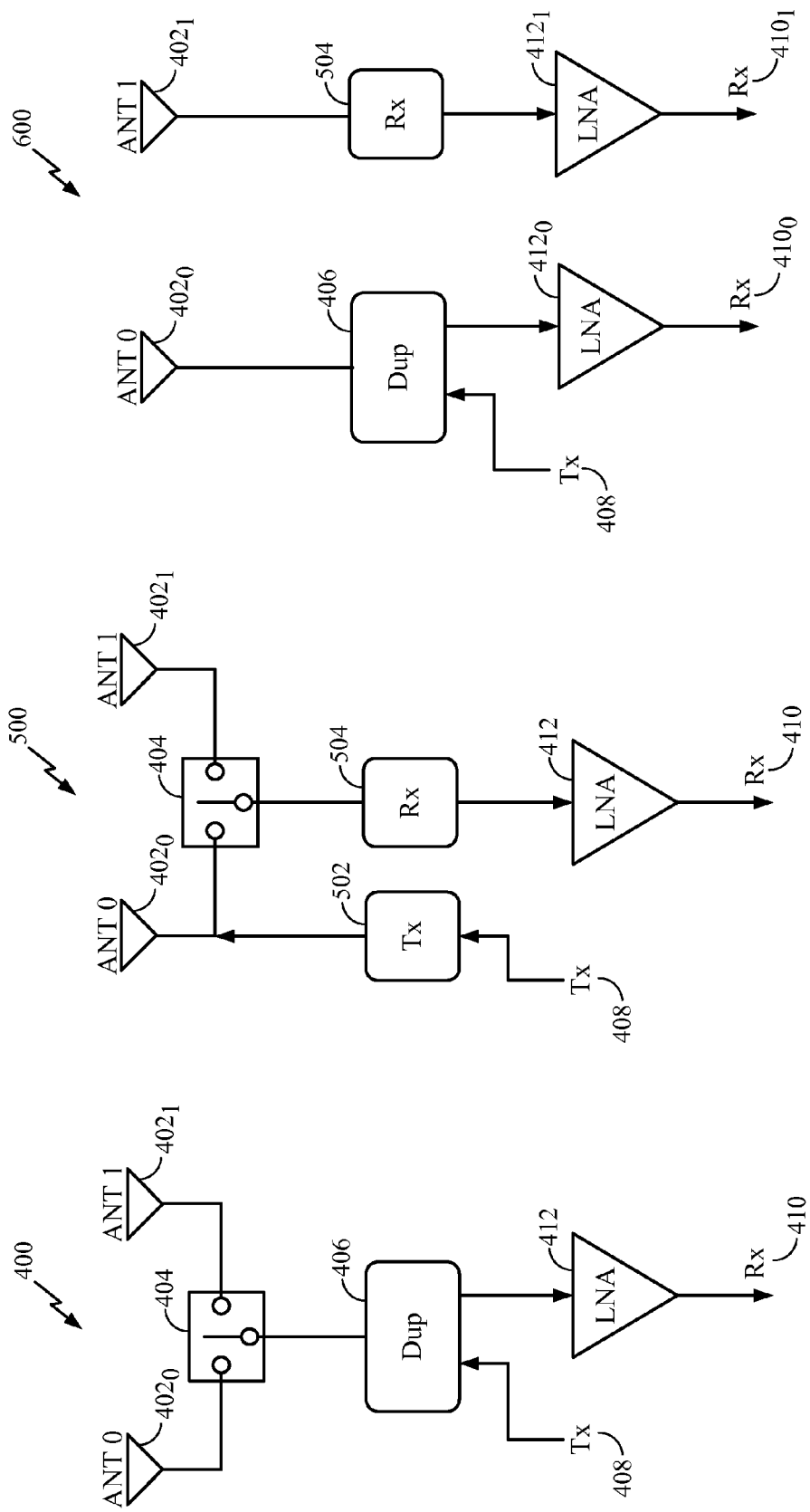

COMBINED INTELLIGENT RECEIVE DIVERSITY (IRD) AND MOBILE TRANSMIT DIVERSITY (MTD) WITH INDEPENDENT ANTENNA SWITCHING FOR UPLINK AND DOWNLINK

CROSS-REFERENCE TO RELATED APPLICATIONS

This application claims the benefit of U.S. Provisional Patent Application No. 61/267,650, entitled "DAA: DYNAMIC ANTENNA ALLOCATION", filed on Dec. 8, 2009, and U.S. Provisional Patent Application No. 61/297,363, entitled "COMBINED INTELLIGENT RECEIVE DIVERSITY 9IRD) AND MOBILE TRANSMIT DIVERSITY (MTD) FOR INDEPENDENT ANTENNA SWITCHING FOR UPLINK AND DOWNLINK", filed on Jan. 22, 2010, both of which are expressly incorporated by reference herein in its entirety.

TECHNICAL FIELD

Certain aspects of the present disclosure generally relate to wireless communications and, more particularly, to independent antenna selection in a user terminal supporting combined receive diversity and transmit diversity.

BACKGROUND

Wireless communication networks are widely deployed to provide various communication services such as telephony, video, data, messaging, broadcasts, and so on. Such networks, which are usually multiple access networks, support communications for multiple users by sharing the available network resources. For example, one network may be a 3G (the third generation of mobile phone standards and technology) system, which may provide network service via any one of various 3G radio access technologies (RATs) including EVDO (Evolution-Data Optimized), 1×RTT (1 times Radio Transmission Technology, or simply 1×), W-CDMA (Wideband Code Division Multiple Access), UMTS-TDD (Universal Mobile Telecommunications System-Time Division Duplexing), HSPA (High Speed Packet Access), GPRS (General Packet Radio Service), and EDGE (Enhanced Data rates for Global Evolution). The 3G network is a wide area cellular telephone network that evolved to incorporate high-speed internet access and video telephony, in addition to voice calls. Furthermore, a 3G network may be more established and provide larger coverage areas than other network systems.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station.

Transceivers with multiple antennas may implement any of various suitable diversity schemes in an effort to increase the reliability of transmitted messages through the use of two or more communication channels with different characteristics. Because individual channels may experience different levels of interference and fading, such diversity schemes may reduce the effects of co-channel interference and fading, as well as avoid error bursts.

One type of diversity scheme utilizes space diversity, where a signal may traverse different propagation paths. In the case of wireless transmission, space diversity may be achieved through antenna diversity using multiple transmitting antennas (transmit diversity) and/or multiple receiving antennas (receive diversity). By using two or more antennas, multipath signal distortion may be eliminated, or at least reduced. In the case of receive diversity with two antennas, the signal from the antenna with the least noise (e.g., highest signal-to-noise ratio (SNR)) is typically selected, while the signal from the other antenna is ignored. Some other techniques use the signals from both antennas, combining these signals for enhanced receive diversity.

SUMMARY

Certain aspects of the present disclosure generally relate to allowing a transmitter (Tx) to perform antenna selection independently of a receiver (Rx) in a transceiver supporting both transmit diversity and receive diversity.

Certain aspects of the present disclosure provide a method for wireless communications. The method generally includes selecting a first one of first and second sets of one or more antennas to connect with a transmit path, wherein the first and second sets are selectable for both transmit diversity and receive diversity; transmitting a first signal via at least one first antenna in the first one of the first and second sets of antennas; independently selecting a second one of the first and second sets of antennas to connect with a first receive path, such that the other one of the first and second sets of antennas is connected with a second receive path; receiving a second signal in the first receive path via at least one second antenna in the selected second one of the sets of antennas; and receiving a third signal in the second receive path via at least one third antenna in the other one of the sets of antennas.

Certain aspects of the present disclosure provide an apparatus for wireless communications. The apparatus generally includes at least one processor configured to select a first one of first and second sets of one or more antennas to connect with a transmit path, wherein the first and second sets are selectable for both transmit diversity and receive diversity; a transmitter configured to transmit a first signal via at least one first antenna in the first one of the first and second sets of antennas, wherein the at least one processor is configured to independently select a second one of the first and second sets of antennas to connect with a first receive path, such that the other one of the first and second sets of antennas is connected with a second receive path; and a receiver configured to receive a second signal in the first receive path via at least one second antenna in the selected second one of the sets of antennas and to receive a third signal in the second receive path via at least one third antenna in the other one of the sets of antennas.

Certain aspects of the present disclosure provide an apparatus for wireless communications The apparatus generally includes means for selecting a first one of first and second sets of one or more antennas to connect with a transmit path, wherein the first and second sets are selectable for both transmit diversity and receive diversity; means for transmitting a first signal via at least one first antenna in the first one of the first and second sets of antennas; means for independently selecting a second one of the first and second sets of antennas to connect with a first receive path, such that the other one of the first and second sets of antennas is connected with a second receive path; means for receiving a second signal in the first receive path via at least one second antenna in the selected second one of the sets of antennas; and means for receiving a third signal in the second receive path via at least one third antenna in the other one of the sets of antennas.

Certain aspects of the present disclosure provide a computer-program product for wireless communications. The computer-program product generally includes a computer-readable medium having instructions stored thereon, the instructions being executable by one or more processors. The instructions typically include instructions for selecting a first one of first and second sets of one or more antennas to connect with a transmit path, wherein the first and second sets are selectable for both transmit diversity and receive diversity; instructions for transmitting a first signal via at least one first antenna in the first one of the first and second sets of antennas; instructions for independently selecting a second one of the first and second sets of antennas to connect with a first receive path, such that the other one of the first and second sets of antennas is connected with a second receive path; instructions for receiving a second signal in the first receive path via at least one second antenna in the selected second one of the sets of antennas; and instructions for receiving a third signal in the second receive path via at least one third antenna in the other one of the sets of antennas.

Certain aspects of the present disclosure provide a method for wireless communications. The method generally includes operating a first receive path configured to receive signals from a first set of one or more antennas and process the signals received from the first set of antennas, wherein a second receive path for receive diversity is configured to receive signals from a second set of one or more antennas, wherein the second receive path is deactivated, and wherein the first set of antennas is different than the second set of antennas; activating the deactivated second receive path; determining at least one first metric based on signals received in the first receive path and at least one second metric based on signals received in the activated second receive path; if the second metric is better than the first metric, deactivating the first receive path and operating the second receive path to process the signals received from the second set of antennas; and if the second metric is not better than the first metric, deactivating the second receive path.

Certain aspects of the present disclosure provide an apparatus for wireless communications. The apparatus generally includes at least one processor configured to operate a first receive path configured to receive signals from a first set of one or more antennas and process the signals received from the first set of antennas, wherein a second receive path for receive diversity is configured to receive signals from a second set of one or more antennas, wherein the second receive path is deactivated, and wherein the first set of antennas is different than the second set of antennas; to activate the deactivated second receive path; to determine at least one first metric based on signals received in the first receive path and at least one second metric based on signals received in the activated second receive path; to deactivate the first receive path and operate the second receive path to process the signals received from the second set of antennas, if the second metric is better than the first metric; and to deactivate the second receive path if the second metric is not better than the first metric.

Certain aspects of the present disclosure provide an apparatus for wireless communications. The apparatus generally includes means for operating a first receive path configured to receive signals from a first set of one or more antennas and process the signals received from the first set of antennas, wherein a second receive path for receive diversity is configured to receive signals from a second set of one or more antennas, wherein the second receive path is deactivated, and wherein the first set of antennas is different than the second set of antennas; means for activating the deactivated second receive path; means for determining at least one first metric based on signals received in the first receive path and at least one second metric based on signals received in the activated second receive path; means for deactivating the first receive path and operating the second receive path to process the signals received from the second set of antennas, if the second metric is better than the first metric; and means for deactivating the second receive path if the second metric is not better than the first metric.

Certain aspects of the present disclosure provide a computer-program product for wireless communications. The computer-program product generally includes a computer-readable medium having instructions stored thereon, the instructions being executable by one or more processors. The instructions typically include instructions for operating a first receive path configured to receive signals from a first set of one or more antennas and process the signals received from the first set of antennas, wherein a second receive path for receive diversity is configured to receive signals from a second set of one or more antennas, wherein the second receive path is deactivated, and wherein the first set of antennas is different than the second set of antennas; instructions for activating the deactivated second receive path; instructions for determining at least one first metric based on signals received in the first receive path and at least one second metric based on signals received in the activated second receive path; instructions for deactivating the first receive path and operating the second receive path to process the signals received from the second set of antennas, if the second metric is better than the first metric; and instructions for deactivating the second receive path if the second metric is not better than the first metric.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 4-5 illustrate block diagrams of different wireless transceiver front-end architectures for achieving receive diversity with antenna selection in the front end, in accordance with certain aspects of the present disclosure.

FIG. 6 illustrates a block diagram of a wireless transceiver front-end architecture for achieving receive diversity with antenna selection in the baseband, rather than in the front end, in accordance with certain aspects of the present disclosure.

DETAILED DESCRIPTION

Various aspects of the present disclosure are described below. It should be apparent that the teachings herein may be embodied in a wide variety of forms and that any specific structure, function, or both being disclosed herein is merely representative. Based on the teachings herein, one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects.

The antenna diversity techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement Institute of Electrical and Electronics Engineers (IEEE) 802.11, IEEE 802.16, Long Term Evolution (LTE), or some other standards. A TDMA system may implement GSM or some other standards. These various standards are known in the art.

An Example Wireless System

Figure 1:
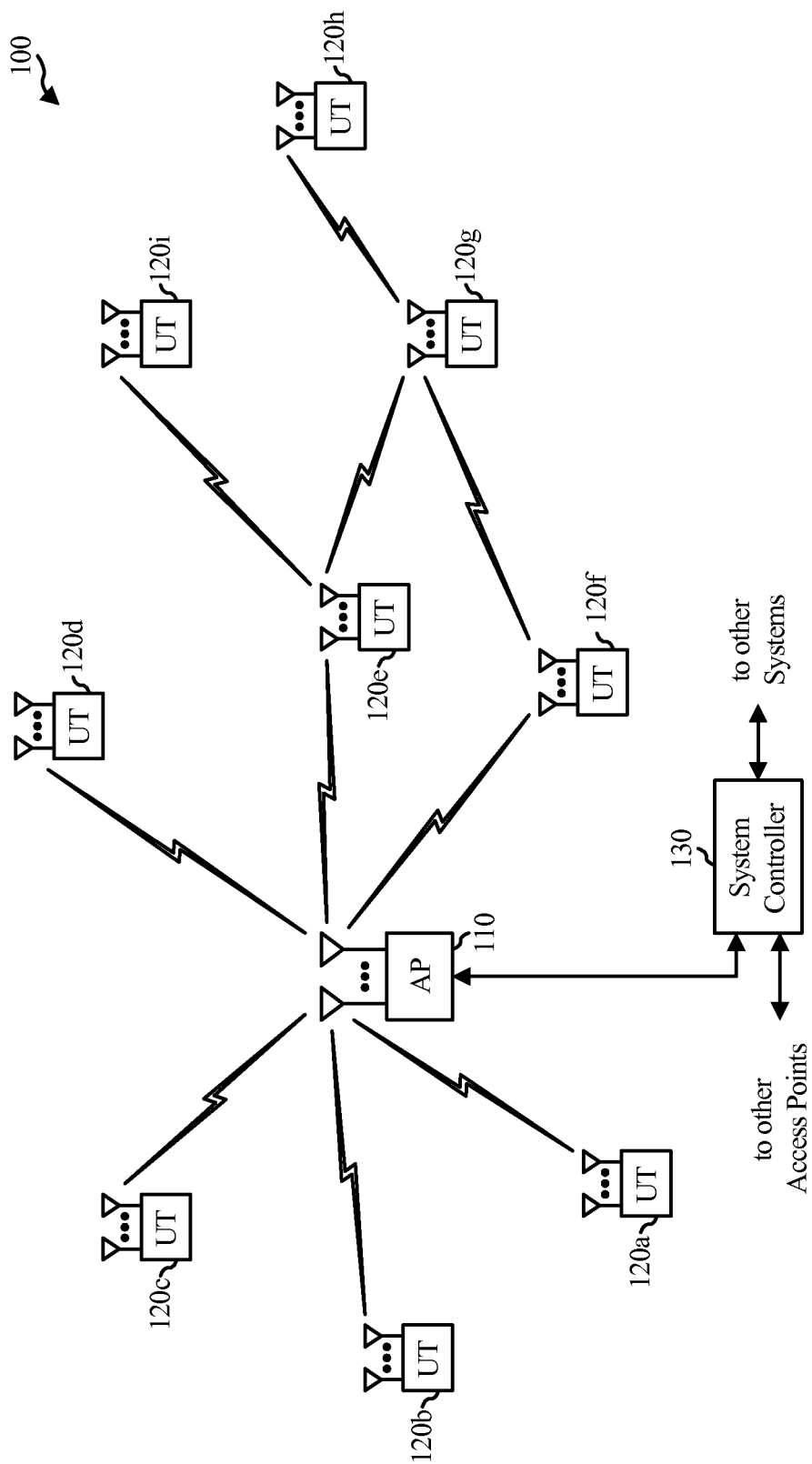
FIG. 1 illustrates a diagram of a wireless communications network in accordance with certain aspects of the present disclosure.

FIG. 1 illustrates a wireless communications system 100 with access points and user terminals. For simplicity, only one access point 110 is shown in FIG. 1. An access point (AP) is generally a fixed station that communicates with the user terminals and may also be referred to as a base station or some other terminology. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 may be equipped with a number $N_{ap}$ of antennas to achieve transmit diversity for downlink transmissions and/or receive diversity for uplink transmissions. A set $N_u$ of selected user terminals 120 may receive downlink transmissions and transmit uplink transmissions. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

Wireless system 100 may be a time division duplex (TDD) system or a frequency division duplex (FDD) system. For a TDD system, the downlink and uplink share the same frequency band. For an FDD system, the downlink and uplink use different frequency bands. System 100 may also utilize a single carrier or multiple carriers for transmission. Each user terminal may be equipped with a single antenna (e.g., in order to keep costs down) or multiple antennas (e.g., where the additional cost can be supported).

Figure 2:
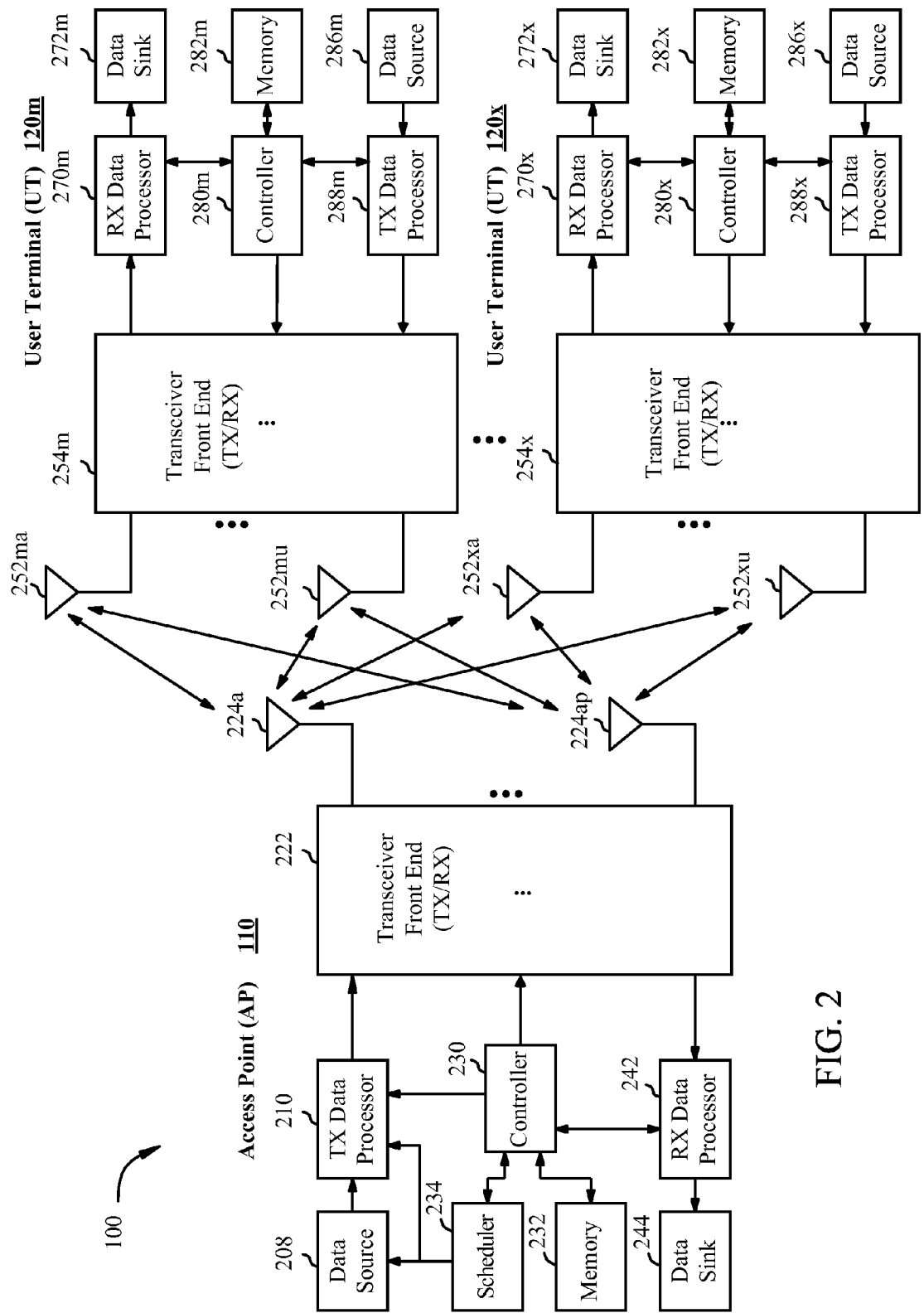
FIG. 2 illustrates a block diagram of an example access point (AP) and user terminals in accordance with certain aspects of the present disclosure.

FIG. 2 shows a block diagram of access point 110 and two user terminals 120m and 120x in wireless system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. Beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up}\}$ for the user terminal based on the coding and modulation schemes associated with the rate selected for the user terminal and provides a data symbol stream $\{s_{up}\}$ for one of the $N_{ut,m}$ antennas. A transceiver front end (TX/RX) 254 receives and processes (e.g., converts to analog, amplifies, filters, and frequency upconverts) a respective symbol stream to generate an uplink signal. The transceiver front end 254 may also route the uplink signal to one of the $N_{ut,m}$ antennas for transmit diversity via an RF switch, for example. The controller 280 may control the routing within the transceiver front end 254.

A number $N_{up}$ of user terminals may be scheduled for simultaneous transmission on the uplink. Each of these user terminals transmits its set of processed symbol streams on the uplink to the access point.

At access point 110, $N_{ap}$ antennas 224a through 224ap receive the uplink signals from all $N_{up}$ user terminals transmitting on the uplink. For receive diversity, a transceiver front end 222 may select signals received from one of the antennas 224 for processing. For certain aspects of the present disclosure, a combination of the signals received from multiple antennas 224 may be combined for enhanced receive diversity. The access point's transceiver front end 222 also performs processing complementary to that performed by the user terminal's transceiver front end 254 and provides a recovered uplink data symbol stream. The recovered uplink data symbol stream is an estimate of a data symbol stream $\{s_{up}\}$ transmitted by a user terminal An RX data processor 242 processes (e.g., demodulates, deinterleaves, and decodes) the recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230 and possibly other data from a scheduler 234. The various types of data may be sent on different transport channels. TX data processor 210 processes (e.g., encodes, interleaves, and modulates) the traffic data for each user terminal based on the rate selected for that user terminal TX data processor 210 may provide a downlink data symbol streams for one of more of the $N_{dn}$ user terminals to be transmitted from one of the $N_{ap}$ antennas. The transceiver front end 222 receives and processes (e.g., converts to analog, amplifies, filters, and frequency upconverts) the symbol stream to generate a downlink signal. The transceiver front end 222 may also route the downlink signal to one or more of the $N_{ap}$ antennas 224 for transmit diversity via an RF switch, for example. The controller 230 may control the routing within the transceiver front end 222.

At each user terminal 120, $N_{ut,m}$ antennas 252 receive the downlink signals from access point 110. For receive diversity at the user terminal 120, the transceiver front end 254 may select signals received from one of the antennas 252 for processing. For certain aspects of the present disclosure, a combination of the signals received from multiple antennas 252 may be combined for enhanced receive diversity. The user terminal's transceiver front end 254 also performs processing complementary to that performed by the access point's transceiver front end 222 and provides a recovered downlink data symbol stream. An RX data processor 270 processes (e.g., demodulates, deinterleaves, and decodes) the recovered downlink data symbol stream to obtain decoded data for the user terminal.

Those skilled in the art will recognize the techniques described herein may be generally applied in systems utilizing any type of multiple access schemes, such as SDMA, OFDMA, CDMA, SDMA, and combinations thereof.

Example Dynamic Antenna Allocation

FIG. 4 illustrates a block diagram 400 of a wireless transceiver front-end architecture for achieving receive diversity with antenna selection in the front end. Although only two antennas ANT0 $402_0$ and ANT1 $402_1$ are illustrated in FIG. 4 (and other figures), the example architectures provided throughout this disclosure may be expanded to cases involving more than two antennas. A radio frequency (RF) switch 404 may select between the antennas 402 for transmitting or receiving signals. A duplexer 406 (or duplexing assembly) may allow the transmit path 408 (represented as "Tx") and the receive path 410 (represented as "Rx") to share a common antenna 402 selected by the switch 404. As used herein, a duplexer generally refers to a switching device that permits bi-directional communication over a single channel through alternate use of the same antenna for both the transmitter and the receiver. For reception, a received signal output from the duplexer 406 may be amplified by a low noise amplifier (LNA) 412 before being processed by the remainder of the receive path 410. The front-end architecture of FIG. 4 also achieves transmit diversity, since the transmit path 408 may transmit signals on either ANT0 or ANT1.

FIG. 5 illustrates a block diagram 500 of a different wireless transceiver front-end architecture for achieving receive diversity with antenna selection in the front end. In FIG. 5, the transmit path 408 may transmit signals only on ANT0 via a transmit filter 502; the transmit path has no way to transmit signals on ANT1. The transmit filter 502 may keep signals received on ANT0 from entering the transmit path and, even more importantly, may prevent the transmit path's high-powered signals from interfering with the lower power received signals. Similarly, signals received by the antenna 402 selected by the switch 404 may be filtered by a receive filter 504 before being amplified by the LNA 412 for the receive path 410. The receive filter 504 may prevent the transmit path's high-powered signals from interfering with the lower power signals wirelessly received by the antennas 402 and ensure that only received signals in the frequency band of interest are processed by the receive path 410.

The transmit filter 502 and/or the receive filter 504 may be implanted with a surface acoustic wave (SAW) filter. As defined herein, a SAW filter generally refers to a semiconductor device that uses the piezoelectric effect to turn an input electrical signal into mechanical vibrations that are converted back into electrical signals in the desired frequency range. In this manner, the SAW filter may filter out undesirable frequencies.

Although the front-end architectures of FIGS. 4 and 5 provide receive diversity, the receive path 410 may experience a discontinuity when the front end is probing to determine selection between the two antennas 402. Furthermore, the RF switch 404 may have an insertion loss of approximately 0.5 dB, thereby leading to decreased sensitivity. In the front-end architecture of FIG. 4, transmission power may be lost if the antenna 402 chosen for increased received SNR has lower efficiency.

Accordingly, what is needed are techniques and apparatus that provide for receive diversity, but overcome the problems and limitations of the front-end architectures of FIGS. 4 and 5.

FIG. 6 illustrates a block diagram 600 of a wireless transceiver front-end architecture for achieving receive diversity with antenna selection in the baseband, rather than in the front end. In FIG. 6, an RF switch is not used. Rather, two receive paths $410_0$, $410_1$ are employed. A duplexer 406 allows antenna ANT0 to be shared by the transmit path 408 and the first receive path $410_0$ including a first LNA $412_0$. A receive filter 504 may filter out undesirable frequencies in a signal received by antenna ANT1 from reaching the second receive path $410_1$ including a second LNA $412_1$.

With the front-end architecture of FIG. 6, receive diversity is achieved with performance gains over the front-end architectures of FIGS. 4 and 5. Because there is no switch causing an insertion loss, sensitivity may be greater than that in the front-end architectures of FIGS. 4 and 5. Moreover, probing of and selection between the receive paths 410 occurs in the baseband, so there is no loss of continuity in the processed signal. In other words, the non-selected receive path may be probed while the selected receive path is operating. Also, since selection occurs in the baseband, switching glitches may be avoided. By using a particular receive path 410 only after convergence, there are no probing gaps in reception of the digitally processed signal, which is what is meant by no loss of continuity (i.e., no reception discontinuity). Finally, the cost of the additional receive path may be negligible, especially when compared to the monetary price of an RF switch and the ensuing insertion loss, which sacrifices performance.

Figure 7:
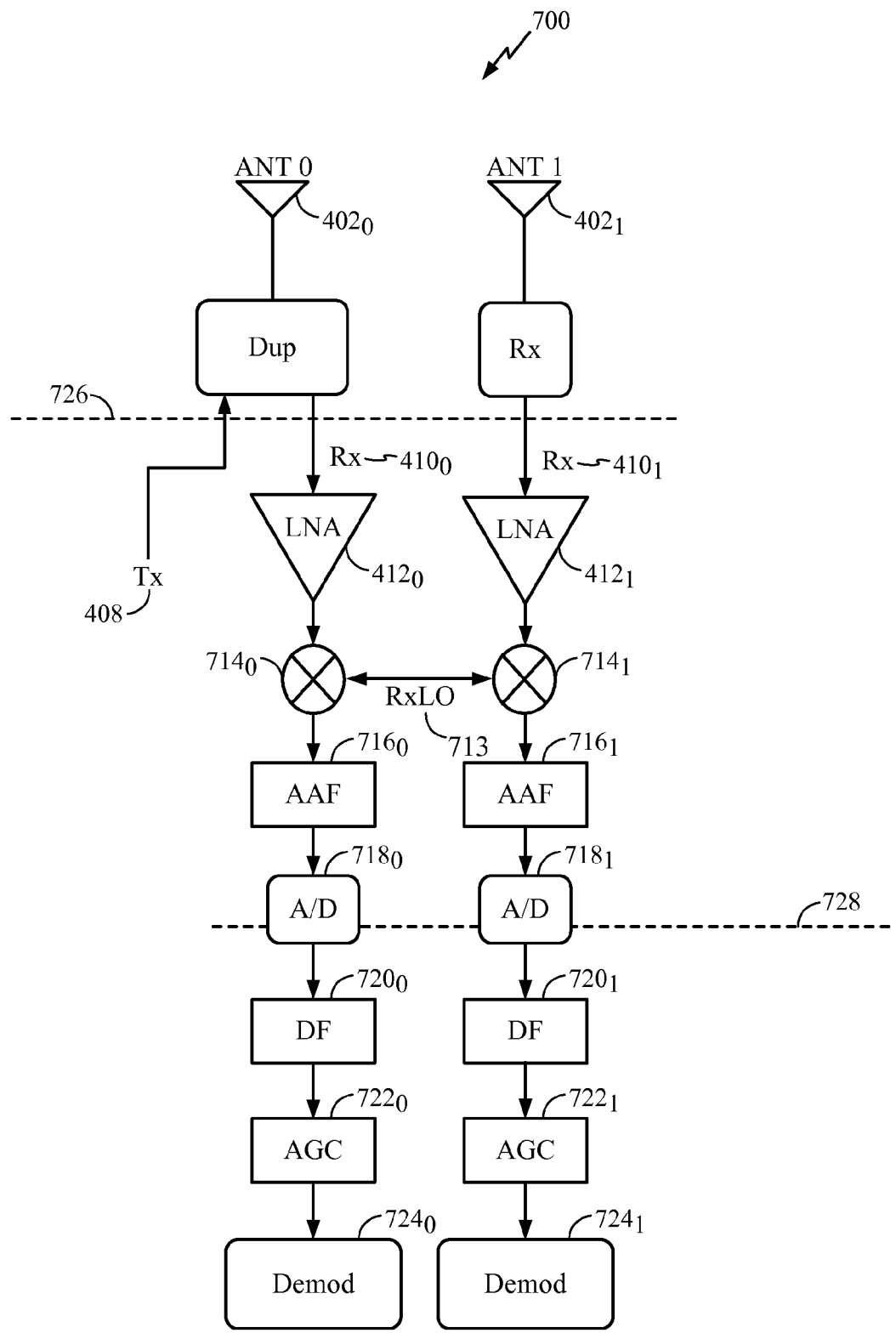
FIG. 7 illustrates a block diagram detailing two receive paths for the transceiver architecture of FIG. 6 with antenna selection in the baseband, in accordance with certain aspects of the present disclosure.

FIG. 7 illustrates an example block diagram 700 showing the two receive paths 410 for the transceiver architecture of FIG. 6 in detail. After the received RF signal has been amplified by the LNA 412, the amplified signal may be mixed with a local oscillator signal (RxLO) 713 by a mixer 714, typically to downconvert the signal to an intermediate frequency (IF). The mixed signal may be filtered by an anti-aliasing filter (AAF) 716 before being digitized (i.e., converted to the digital domain) by an analog-to-digital converter (ADC) 718. Digital signal processing may include processing the digitized signal in one or more digital filters (DF) 720, an automatic gain compensation (AGC) block 722, and a demodulator 724 before the received information may be finally extracted from the signal received at the antennas 402.

The dashed line 726 may represent a chip boundary, such that blocks below the line 726 may be incorporated in one or more integrated circuits (ICs), while the items above the dashed line 726 may be outside of the ICs and located on a printed circuit board (PCB) for the user terminal 120 (or access point 110). The dashed line 728 may represent a demarcation between the RF analog domain and the baseband domain, such that components above the line 728 operate in the RF domain, while items below the line 728 operate in the baseband domain.

In operation, one of the receive paths (e.g., $410_0$) may be the selected receive path (i.e., the primary path), and signals received at ANT0 may be processed through the receive path $410_0$ in an effort to extract information from the received signals. While the selected receive path $410_0$ is operating, the non-selected receive path (e.g., $410_1$) may be briefly activated in an effort to probe the signals received at ANT1. This brief activation may occur periodically, repeatedly at non-periodic intervals, or intermittently. However, temporary activation of both receive paths is not to be confused with a receive diversity scheme involving combining information from the two receive paths 410, although this may be done as another possibility for certain aspects. Rather, the noise (and/or interference) on each receive path 410 may be measured, and a measure of each receive path's SNR (or SINR) may be calculated. For certain aspects, this calculation may comprise determination of a channel quality indicator (CQI).

If the current selected receive path (i.e., the primary path) $410_0$ is deemed to have lower noise (e.g., a higher SNR or better CQI) than that of the current non-selected path $410_1$, then the receive path $410_0$ may remain activated as the primary path. However, if the current non-selected receive path (i.e., the secondary path) $410_1$ is deemed to have lower noise (e.g., a higher SNR or better CQI) than that of the current selected path $410_0$, then the receive path $410_0$ may be deactivated, and the former non-selected path $410_1$ may be activated as the selected receive path for at least a certain dwelling period (e.g., 10 or more frames). Once this swap occurs, signals received at ANT1 may be processed through the receive path $410_1$ in an effort to extract information from the received signals, at least until the receive path $410_0$ is once again determined to have lower noise through brief activation of the non-selected receive path $410_0$ for probing purposes.

For example, while performing full minimum mean square error (MMSE) receive diversity, separate CQIs may be computed for ANT0 and ANT1. If the CQI for the currently selected receive path is suitable to maintain the desired performance level, the other receive path may be deactivated. As another example, while receiving the primary received signal (Prx), the CQI for the diversity received signal (Drx) may also be measured. The receive path for the Drx may be selected if the CQI for the Drx is better than that of the Prx, and the receive path for the Prx may be subsequently deactivated.

For certain aspects, the SNR (or other metric) of the current non-selected receive path may need to be higher than the SNR (or higher or lower than the other corresponding metric, depending on the metric) of the current selected receive path by at least a certain amount (i.e., a threshold value) before the non-selected receive path is selected as the new selected receive path in an effort to provide increased system stability.

During the brief activation of the non-selected receive path, the AGC block 722, digital filters 720, and other components in the front-end architecture may most likely be provided sufficient settling time for the processed signal to converge before determining the noise on the non-selected receive path. By waiting to measure the noise until after convergence, whenever the current non-selected receive path is considered to have lower noise than the current selected receive path, the current non-selected receive path can be safely and immediately relied on as the new selected receive path for exclusive reception. In this manner, the receive path swap may occur without any glitches or other loss of continuity. Furthermore, there are no gaps in reception for probing purposes.

For certain aspects, the brief activation of non-selected receive paths may involve all available antennas or any subset thereof For certain aspects, the brief activation and probing of the non-selected receive path(s) may occur while continuing reception on the current selected receive path. For certain aspects, the one or more metrics—determined during or after probing of the receive paths 410 to make the decision in selecting one of the receive paths for reception—may be performance-related (e.g., CQI, SNR, signal-to-interference-plus-noise ratio (SINR), bit error rate (BER), block error rate (BLER), non-dropped call, and/or data rate (throughput)), may be related to the availability or cost of resources for the user terminal 120 (e.g., heat or battery power), may be related to the availability or cost of resources for the access point 110 (e.g., downlink transmit power), may be related to the availability or cost of resources for the network (e.g., network capacity), or any combination thereof.

A combination of metrics may yield higher user satisfaction with performance. For example, energy-aware adaptive activating (or deactivating) receive diversity (e.g., both receive paths 410 on) increases not just performance, but enhances the performance-versus-power-consumption tradeoff, which is often more important to users than pure performance by itself.

For certain aspects of the present disclosure, the probing ("sounding") of candidate sets of antennas for receive diversity may be appropriately scheduled during time intervals that do not interfere with another measurement being made by the user terminal (or access point). In other words, the probing need not interfere with extraordinary events unrelated to the direct business of receiving. For example, the probing may not be scheduled during Compressed-Mode, inter-RAT (radio access technology) measurements, etc. in UMTS. For instance, Compressed-Mode may most likely be scheduled only when receiving on the primary antenna(s) (i.e., using receive path $410_0$).

Figure 8:
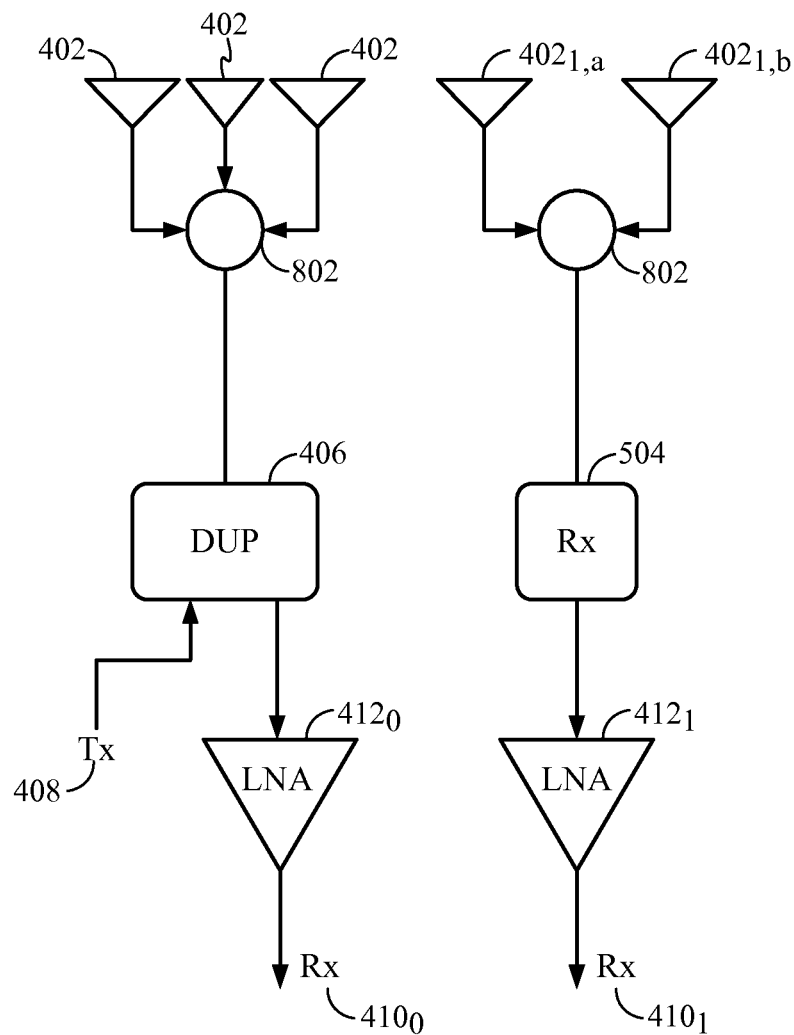
FIG. 8 illustrates a block diagram for combining or selecting between signals received from a plurality of antennas in the transceiver architecture of FIG. 6, in accordance with certain aspects of the present disclosure.

As illustrated in FIG. 8, each receive path 410 in the transceiver architecture of FIG. 6 described above may be associated with one or more antennas 402. When a single receive path 410 may receive signals from more than one antenna, an RF selector/combiner 802 may connect the antennas 402 with the duplexer 406 or receive filter 504 in the receive path 410. The selector/combiner 802 may function to select between one of the antennas 402 for reception or may combine the received RF signals from multiple antennas, in an effort to obtain extra diversity.

For example, while the transceiver is operating with selected receive path $410_0$, the non-selected receive path $410_1$ may be probed (by measuring one or more metrics such as noise as described above) using one or more of various possible configurations of the antennas $402_{1,a}$, $402_{1,b}$ associated with this receive path. For example the metric(s) may be measured with signals received by only antenna $402_{1,a}$, then with signals received by only antenna $402_{1,b}$, and then with signals received from both antennas $402_{1,a}$, $402_{1,b}$ combined by the selector/combiner 802. Then, if the metric (e.g., SNR) of the non-selected receive path $410_1$ for any of the three configurations of antennas $402_{1,a}$, $402_{1,b}$ is better than the antenna configuration being used (or, for certain aspects, all possible antenna configurations) on the current selected receive path $410_0$, then the non-selected receive path $410_1$ may become the new selected receive path for exclusive reception with one of the three possible configurations of antennas $402_{1,a}$, $402_{1,b}$, most likely the antenna configuration yielding the best metric(s).

Figure 3:
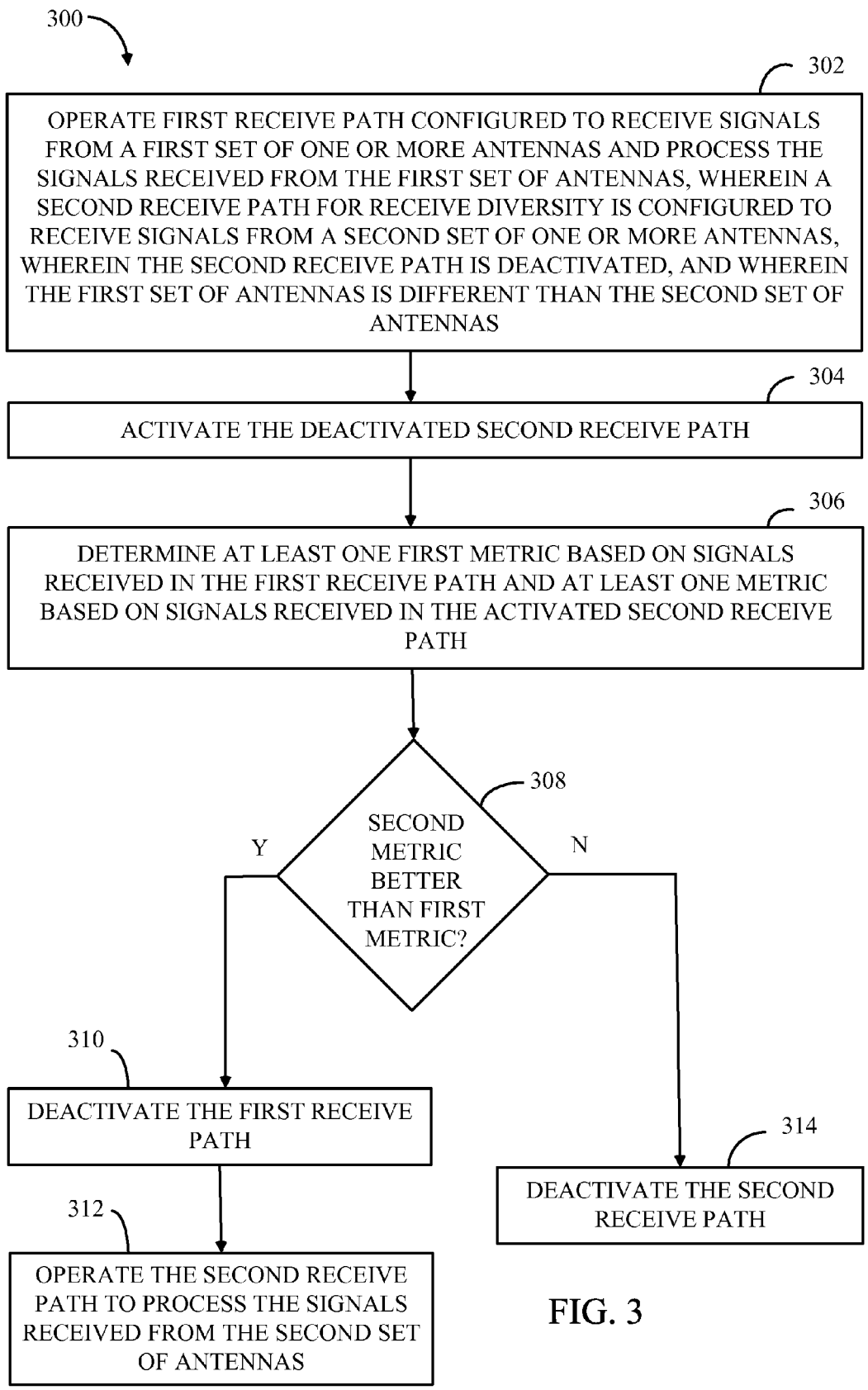
FIG. 3 illustrates example operations for probing different sets of receive antennas by activating/deactivating different receive chains for receive diversity, in accordance with certain aspects of the present disclosure.
Figure 3A:
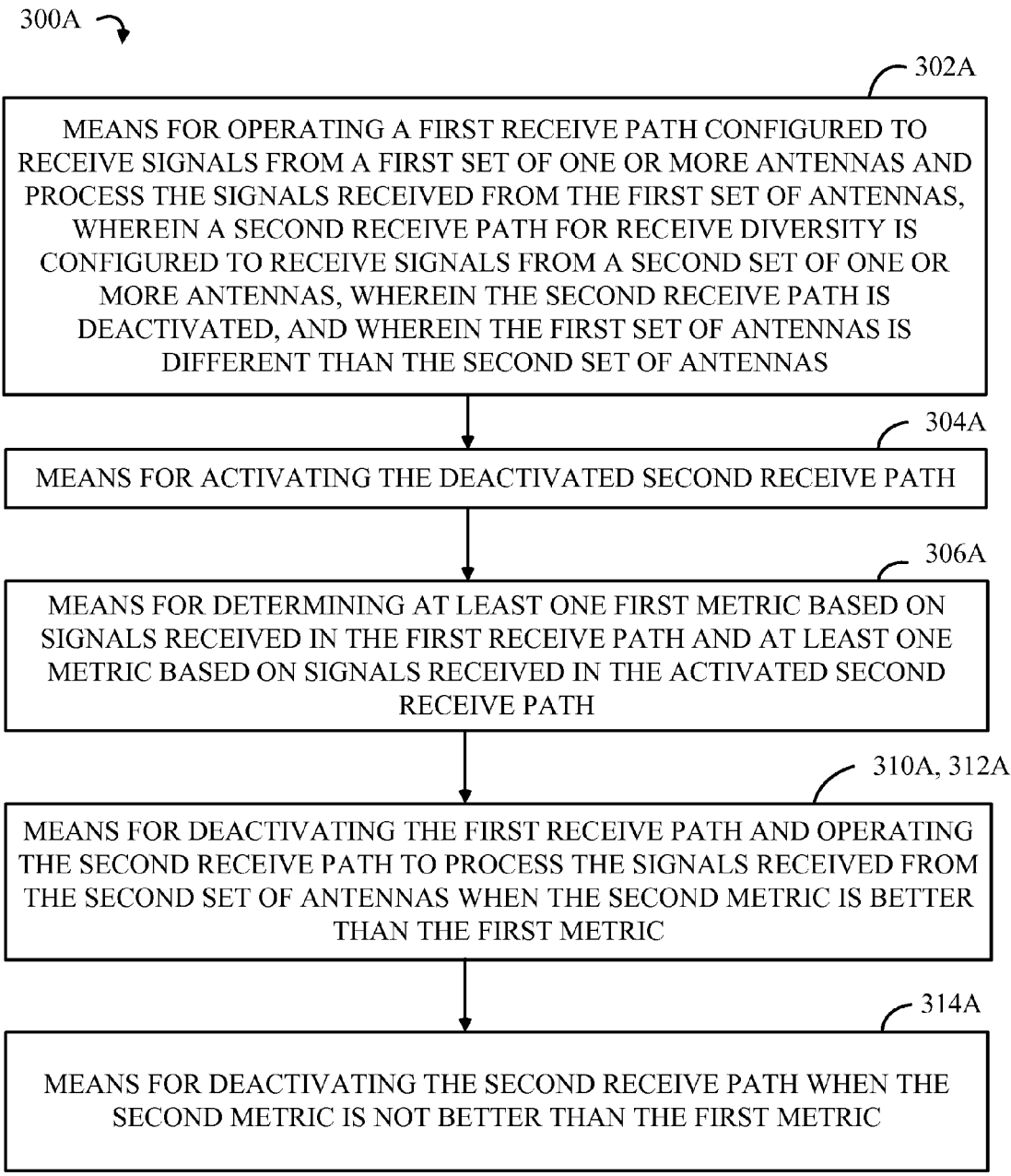
FIG. 3A illustrates example means for performing the operations of FIG. 3.

FIG. 3 illustrates example operations 300 for probing different sets of receive antennas by activating/deactivating different receive chains for receive diversity. The operations 300 may be performed, for example, by a user terminal 120 or an access point 110. The operations 300 may begin, at 302, by operating a first receive path (e.g., receive path $410_0$) configured to receive signals from a first set of one or more antennas (e.g., the three antennas 402 coupled to the first receive path $410_0$ in FIG. 8) and process the signals received from the first set of antennas. The second receive path (e.g., receive path $410_1$) for receive diversity may be configured to receive signals from a second set of one or more antennas (e.g., antennas $402_{1,a}$, $402_{1,b}$). At 302, the second receive path may be deactivated. The first set of antennas is different than the second set of antennas.

At 304, the second receive path may be deactivated. At 306, at least one first metric may be determined based on signals received in the first receive path, and at least one second metric may be determined based on signals received in the activated second receive path.

If the second metric is better than the first metric (e.g., the second SNR is higher than the first SNR) at 308, the first receive path may be deactivated at 310, and the second receive path may be operated to process the signals received from the second set of antennas. If the second metric is not better than the first metric, however, the second path may be deactivated at 314.

For certain aspects, at least one third metric may be determined based on a combination of signals received in the first and second receive paths. If the third metric is better than the first and the second metrics, the first and the second receive paths may be operated to process the signals received from the first and second sets of antennas. If the third metric is not better than the first and the second metrics, however, the second receive path may be deactivated.

Figure 9:
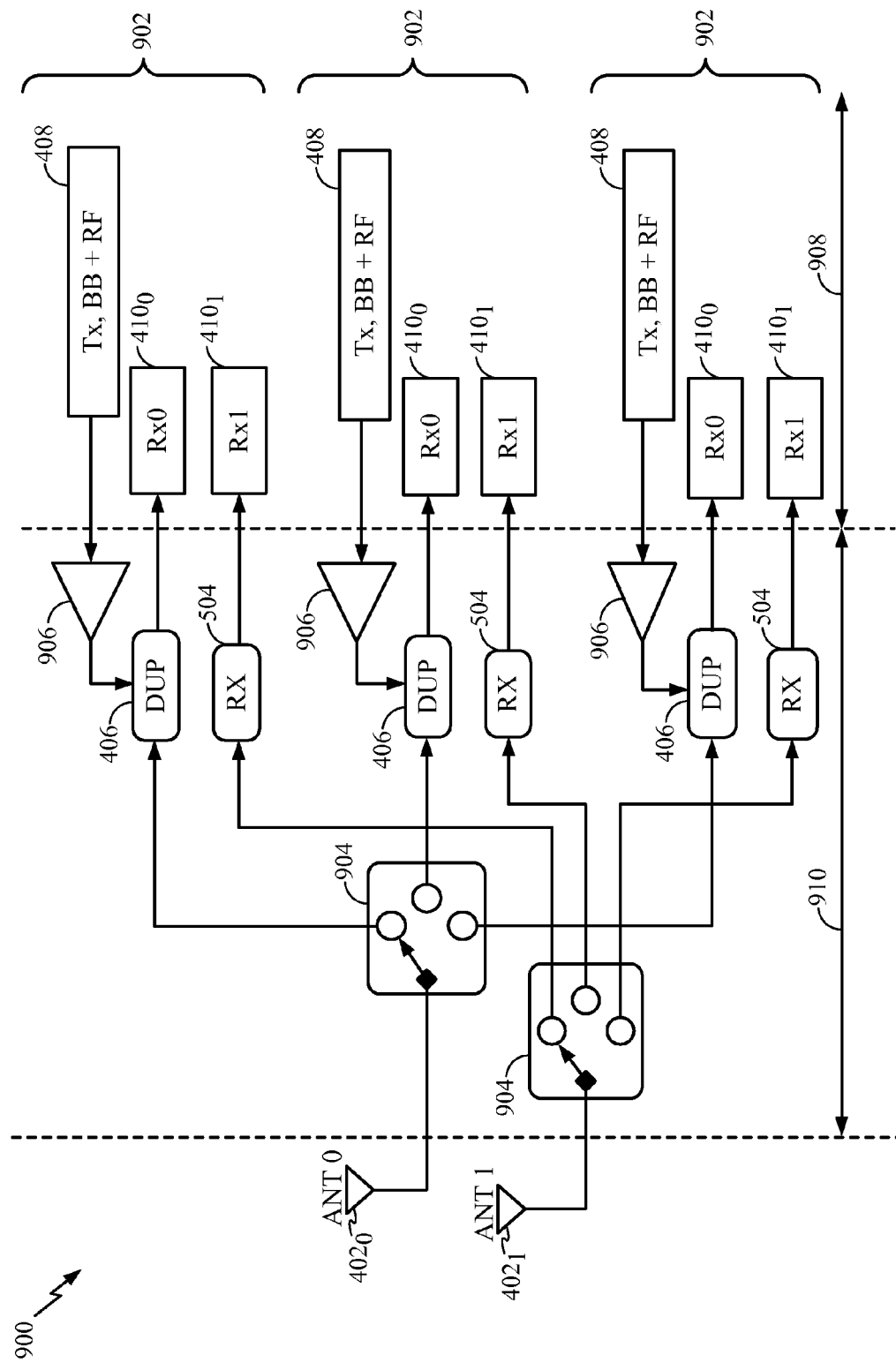
FIG. 9 illustrates a block diagram of a wireless transceiver front-end architecture for achieving receive diversity, with the architecture of FIG. 6 replicated to form multiple transceiver channels and a switchplexer for directing signals between each antenna and one of the three channels, in accordance with certain aspects of the present disclosure.

An Example Combined IRD and MTD with Independent Antenna Switching for Uplink and Downlink Expanding upon the transceiver architecture of FIG. 6, FIG. 9 illustrates a block diagram 900 of a wireless transceiver front-end architecture for achieving receive diversity, with the architecture of FIG. 6 replicated to form multiple transceiver channels 902 and a switchplexer 904 for directing signals between each antenna 402 and one of the channels 902. Although two antennas 402 and three transceiver channels 902 are illustrated in FIG. 9, the ideas described herein may be expanded to any number of antennas and any number of transceiver channels. Furthermore, for some aspects, the switches internal to the switchplexer 904 may move together to select among different transceiver channels 902, while for other aspects, the switches may move independently such that different receive paths 410, rather than different channels 902, may be selected. FIG. 9 also illustrates a power amplifier (PA) 906 in each of the transmit paths 408 for amplifying a signal to be transmitted via ANT0. Section 908 may represent the circuit blocks within one or more ICs, while section 910 may represent components residing outside of the ICs, such as circuits disposed on a printed circuit board (PCB).

In FIG. 9, the transmit paths 408 may only transmit signals on ANT0, so there is no transmit diversity with respect to the antennas. However, signals received on either ANT0 or ANT1 may be processed by the various receive paths 410, thereby providing receive diversity. For example, signals received on ANT0 may be processed by one of the three receive paths $410_0$, whereas signals received on ANT1 may be processed by one of the three receive paths $410_1$.

Figure 10:
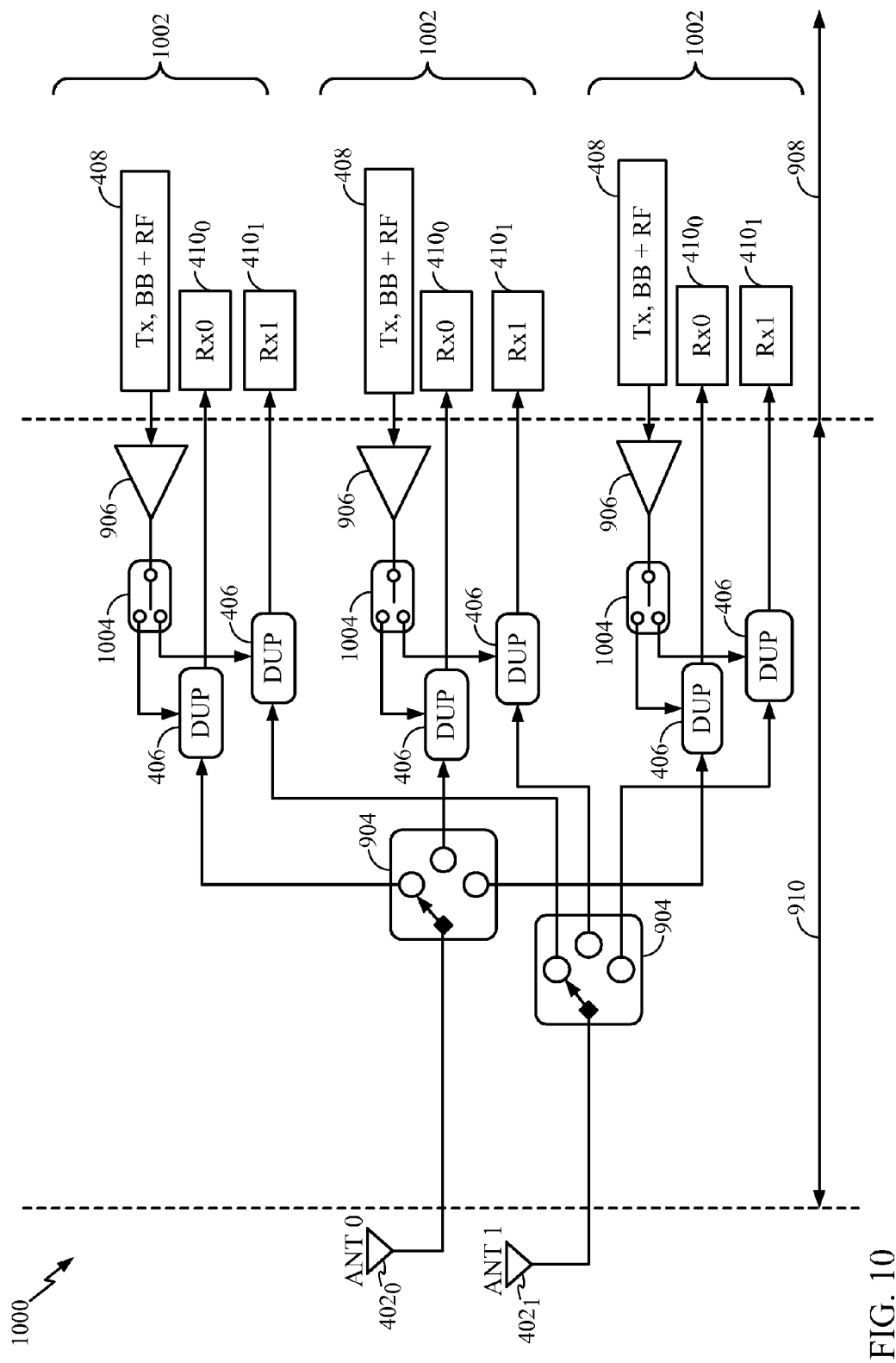
FIG. 10 illustrates a block diagram of a wireless transceiver front-end architecture for achieving transmit diversity, with multiple transceiver channels and a switchplexer for directing signals between each antenna and one of the three channels, in accordance with certain aspects of the present disclosure.

FIG. 10 illustrates a block diagram 1000 of a wireless transceiver front-end architecture for achieving transmit diversity, with multiple transceiver channels 1002 and a switchplexer 904 for directing signals between each antenna and one of the three channels. For each transceiver channel 1002 in FIG. 10, a switch 1004 (e.g., a single-pole, double-throw (SPDT) switch) may select one of two duplexers 406 through which the output signal generated by the power amplifier (PA) 906 may be sent via the switchplexer 904 to one of the antennas ANT0 or ANT1. In this manner, transmit diversity may be achieved. However, since each receive path 410 may only receive signals from a single antenna, the architecture of FIG. 10 does not achieve receive diversity with respect to antenna selection.

In the wireless transceiver front-end architectures described above with, as well as in conventional front-end architectures with antenna diversity, switching between antennas typically forces the receive path to switch every time the transmit path switches, or vice versa. However, receive path (Rx) performance (e.g., based on SINR) is not necessarily maximized where transmit path (Tx) performance is, and vice versa. By selecting an antenna for best performance in the transmit path, receive path performance may suffer, or vice versa. Moreover, by switching between one antenna for receive and another antenna for transmit, switching glitches may most likely be introduced into at least the receive path.

Accordingly, what is needed are techniques and apparatus for independent antenna selection between transmitting and receiving (e.g., between uplink and downlink transmissions). Ideally, such solutions would work in transceivers with combined receive diversity and transmit diversity and would not introduce any switching glitches.

Figure 11:
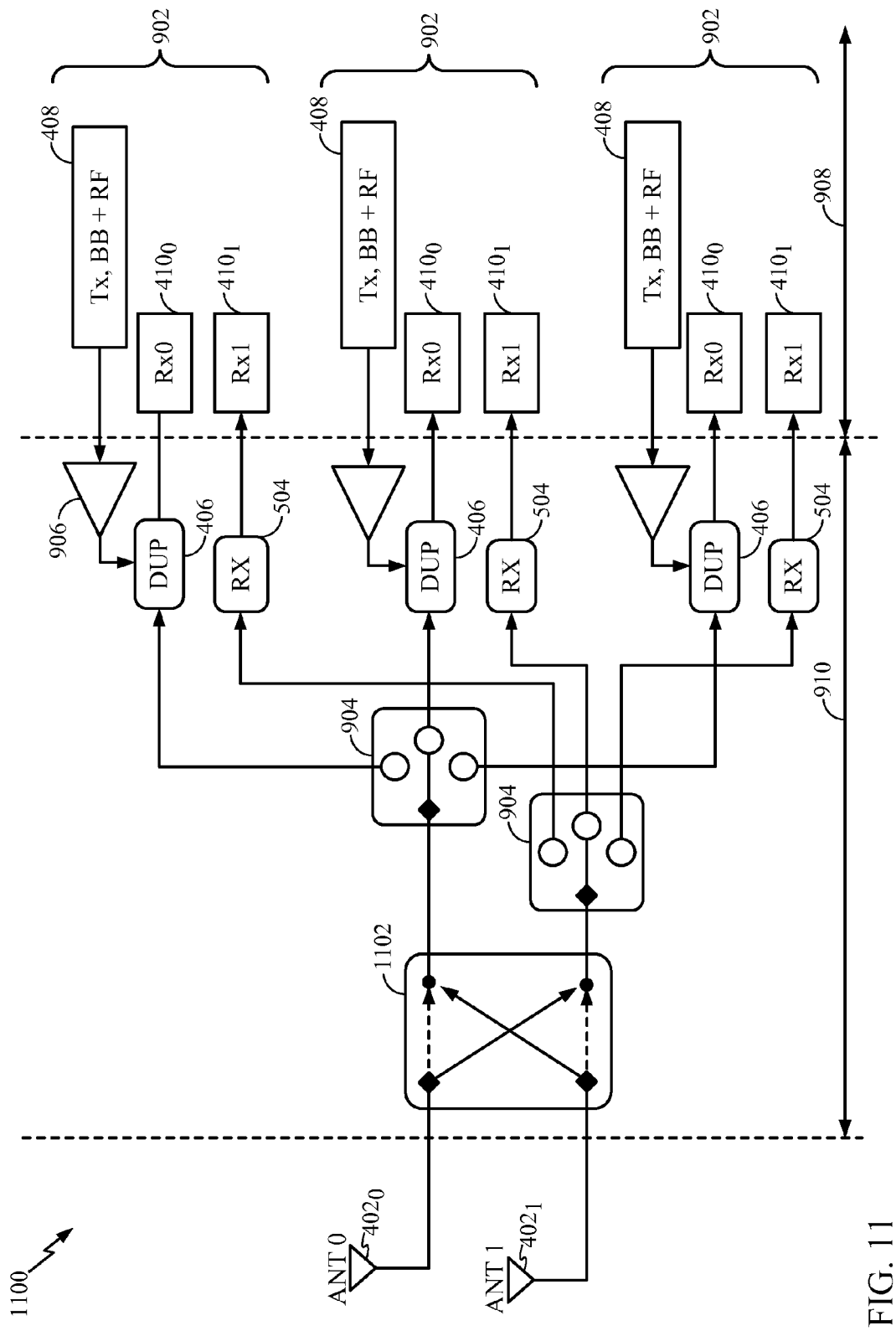
FIG. 11 illustrates a block diagram of a wireless transceiver front-end architecture for achieving combined receive and transmit diversity, with the architecture of FIG. 6 replicated to form multiple transceiver channels, a cross switch for selecting the antennas in a parallel or cross configuration, and a switchplexer for directing signals between each output of the cross switch and one of the three channels, in accordance with certain aspects of the present disclosure.

FIG. 11 illustrates a block diagram 1100 of a wireless transceiver front-end architecture for achieving combined receive and transmit diversity with independent antenna selection for transmitting and receiving. The architecture in FIG. 11 is similar to the architecture in FIG. 9, but with the addition of a cross switch 1102 between the antennas 402 and the switchplexer 904.

The cross switch 1102 may switch between a parallel (=) or a cross (X) configuration between the four contact points. Although only four contact points are shown for a cross switch linking two antennas to a 2-input switchplexer (or two independent switchplexers) as an example, the ideas described herein may be expanded to other cross switch configurations. When the cross switch 1102 is in the parallel configuration, ANT0 may be coupled to the duplexer 406, the transmit path 408, and the receive path $410_0$ in each transceiver channel 902, and ANT1 may be coupled to the receive filter 504 and the receive path $410_1$ in each transceiver channel 902. When the cross switch 1102 is in the cross configuration, ANT1 may be coupled to the duplexer 406, the transmit path 408, and the receive path $410_0$ in each transceiver channel 902, and ANT0 may be coupled to the receive filter 504 and the receive path $410_1$ in each transceiver channel 902.

With the cross switch 1102, the transmit path 408 may transmit signals on either ANT0 (parallel configuration) or ANT1 (cross configuration), thereby achieving transmit diversity. Furthermore, the receive path $410_0$ may receive signals on either ANT0 (parallel configuration) or ANT1 (cross configuration), thereby achieving receive diversity. Likewise, the receive path $410_1$ may receive signals on either ANT1 (parallel configuration) or ANT0 (cross configuration), thereby also achieving receive diversity. Accordingly, the front-end architecture in FIG. 11 supports both transmit diversity (more specifically, antenna switched transmit diversity) and receive diversity, and the antenna for transmitting (e.g., for uplink) may be selected independently of the antenna for receiving (e.g., for downlink). Furthermore, the receiver (including both receive paths $410_0$ and $410_1$ for at least one transceiver channel 902) may operate on the same antenna as the transmitter (e.g., the transmit path 408 for at least one transceiver channel 902), on an antenna different from the transmitter, or on both antennas, combining the signals received on both antennas for enhanced receive diversity.

To avoid, or at least reduce, any switching glitches when switching between configurations of the cross switch 1102, switching of the signal may also occur between the two receive paths $410_0$, $410_1$ in the baseband domain after digitization. For example, the modem software or firmware may handle this corresponding additional (nearly) simultaneous baseband switching, which may allow a particular newly selected receive path to converge before messages are read from this particular receive path. Before converging, the messages may be read from the previously selected receive path. As used herein, converging generally refers to the baseband processing loops (e.g., the channel estimation loop, a time tracking loop, or a frequency tracking loop) having settled or reached a steady state condition.

Figure 12:
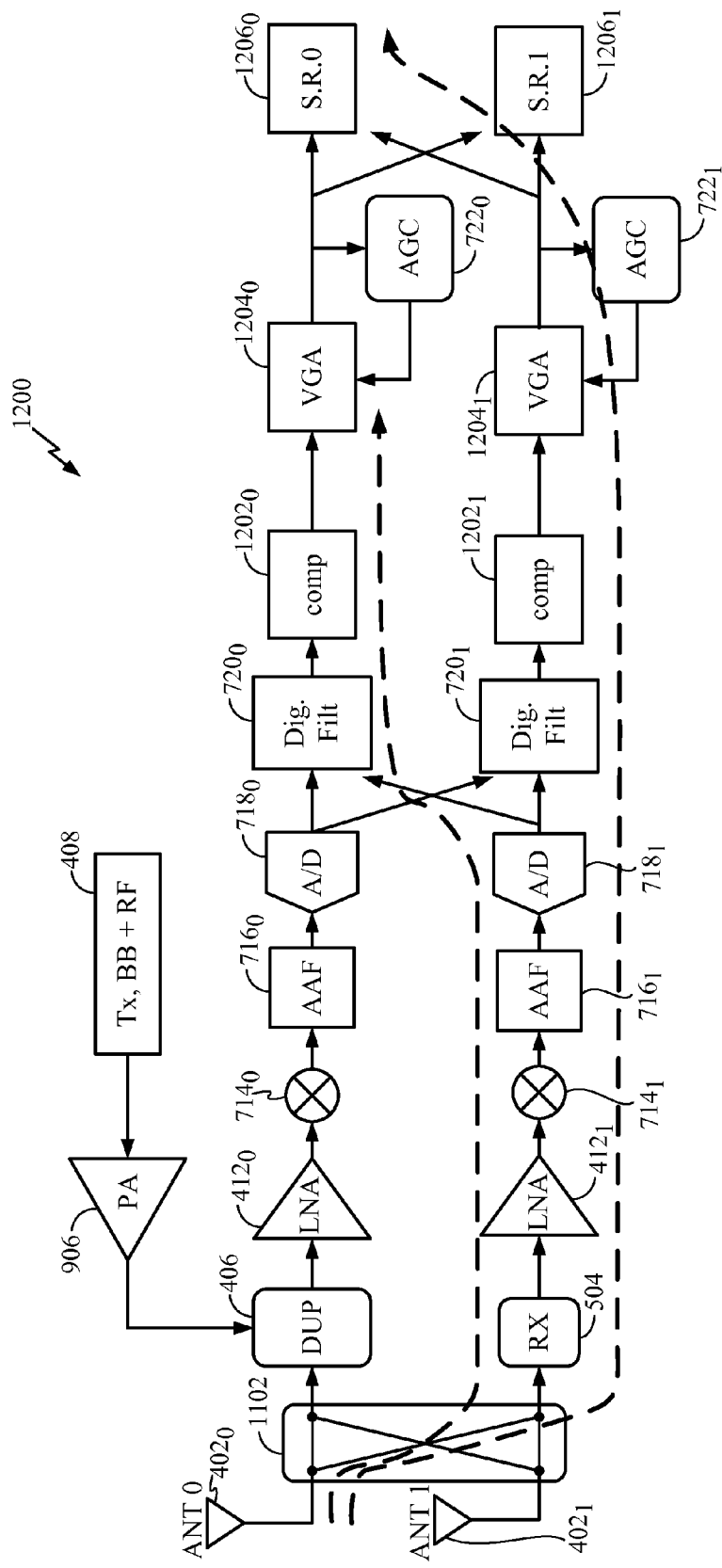
FIG. 12 illustrates a block diagram of the two receive paths for the transceiver architecture of FIG. 7 with a cross switch added for combined transmit and receive diversity with independent antenna selection between uplink and downlink, in accordance with certain aspects of the present disclosure.

As an example, FIG. 12 illustrates a block diagram 1200 of the two receive paths for the transceiver architecture of FIG. 7 with a cross switch 1102 added for combined transmit and receive diversity with independent antenna selection between uplink and downlink, in accordance with certain aspects of the present disclosure. Another way to view FIG. 12 is to consider the block diagram 1200 as illustrating a single transceiver channel 902 from FIG. 11 without a switchplexer 904.

Prior to the reception shown in FIG. 12, the cross switch 1102 was in the parallel configuration, such that the receive path $410_0$ may have been receiving signals from ANT0 and the receive path $410_1$ may have been receiving signals from ANT1 during transmissions from the transmit path 408 via ANT0. After the cross switch 1102 is switched to the cross configuration as shown in FIG. 12, signals received by ANT0 may be digitized by the ADC $718_1$ after being routed to the receive filter 504, amplified by the LNA $412_1$, mixed with the local oscillator $714_1$, and filtered by the anti-alias filter $716_1$.

Because the remaining components in the digital baseband domain for receive path $410_1$ may not have yet converged, the digitized signal from receive path $410_1$ may be processed by the digital filter $720_0$ and other components from receive path $410_0$. These other components may include a compensation block $1202_0$ and a variable gain amplifier (VGA) $1204_0$ associated with the AGC block $722_0$. The compensation block 1202 may process CORDIC (COordinate Rotation DIgital Computer) algorithms and adjust IQ imbalance, DC offset, and the like. The processed results from the VGA $1204_0$ may be stored in a sample RAM $1206_1$ (or other type of memory buffer) for receive path $410_1$. Once the components in the digital baseband domain have converged in receive path $410_1$ for signals received on ANT0, then the digitized signal may be processed by the digital filter $720_1$ and other subsequent components from receive path $410_1$.

As described above, this baseband switching may be controlled by the modem firmware or software. By handling the switching glitch in the baseband, certain aspects of the present disclosure may provide seamless transitioning from one antenna to another when changing the configuration of the cross switch. In other words, received signal continuity may be ensured without any performance loss that would likely occur if the receive path had to re-converge.

Figure 13:
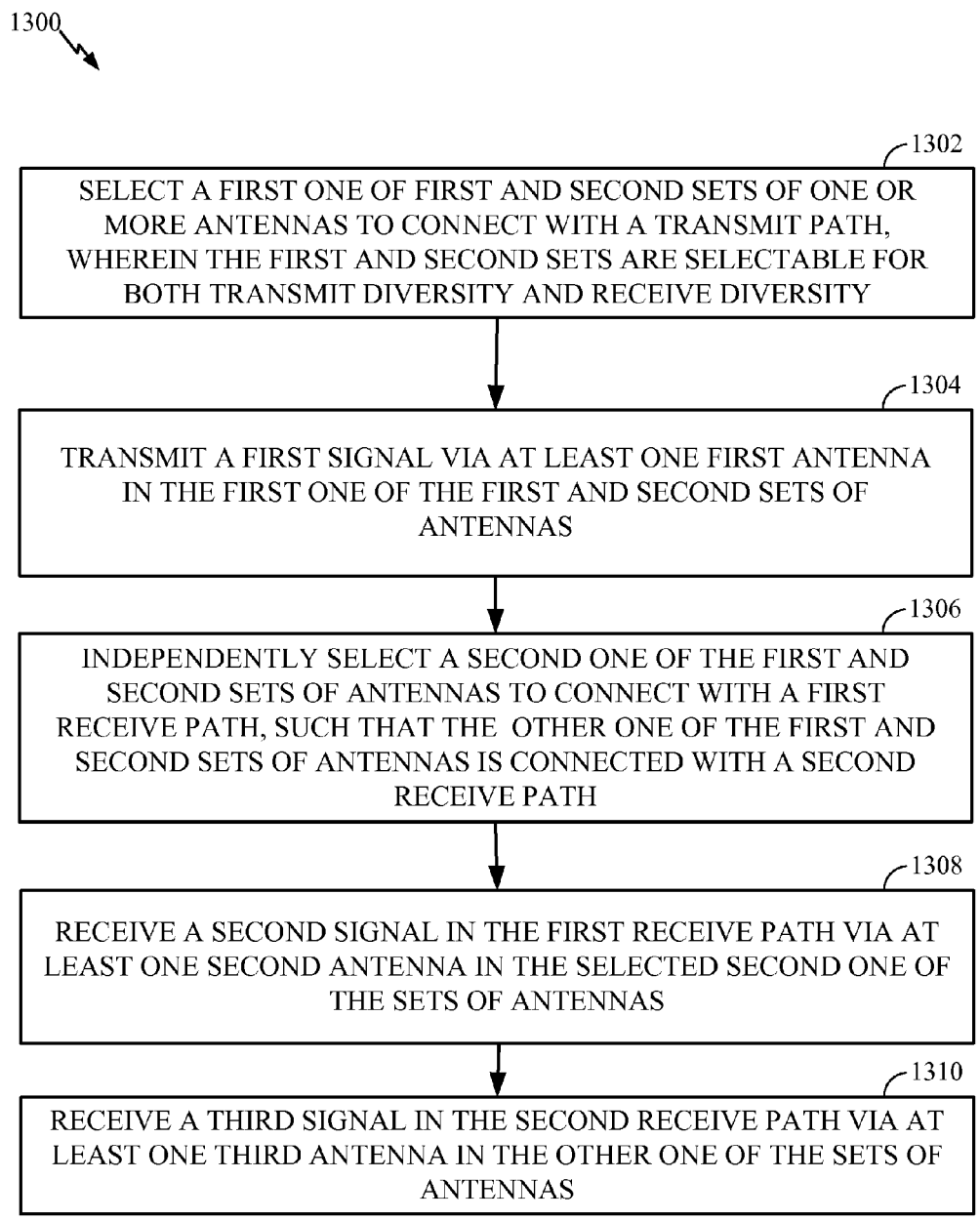
FIG. 13 illustrates example operations for allowing a transmitter (Tx) to perform antenna selection independently of a receiver (Rx) in a transceiver supporting both transmit diversity and receive diversity, in accordance with certain aspects of the present disclosure.

FIG. 13 illustrates example operations 1300 that may be performed, for example, by a wireless transceiver in a user terminal 120 or an access point 110, for allowing a transmitter (Tx) to perform antenna selection independently of a receiver (Rx) in a transceiver supporting both transmit diversity and receive diversity. The operations 1300 may begin, at 1302, by selecting a first one of first and second sets of one or more antennas to connect with a transmit path, wherein the first and second sets are selectable for both transmit diversity and receive diversity. At 1304, the transceiver may transmit a first signal via at least one first antenna in the first one of the first and second sets of antennas selectable for both (antenna switched) transmit diversity and receive diversity.

At 1306, the transceiver may independently select a second one of the first and second sets of antennas, such that the other one of the first and second sets of antennas is connected with a second receive path. At 1308, the transceiver may receive a second signal in the first receive path via at least one second antenna in the selected second one of the sets of antennas. The transceiver may receive, at 1310, a third signal in the second receive path via at least one third antenna in the other one of the sets of antennas.

Figure 13A:
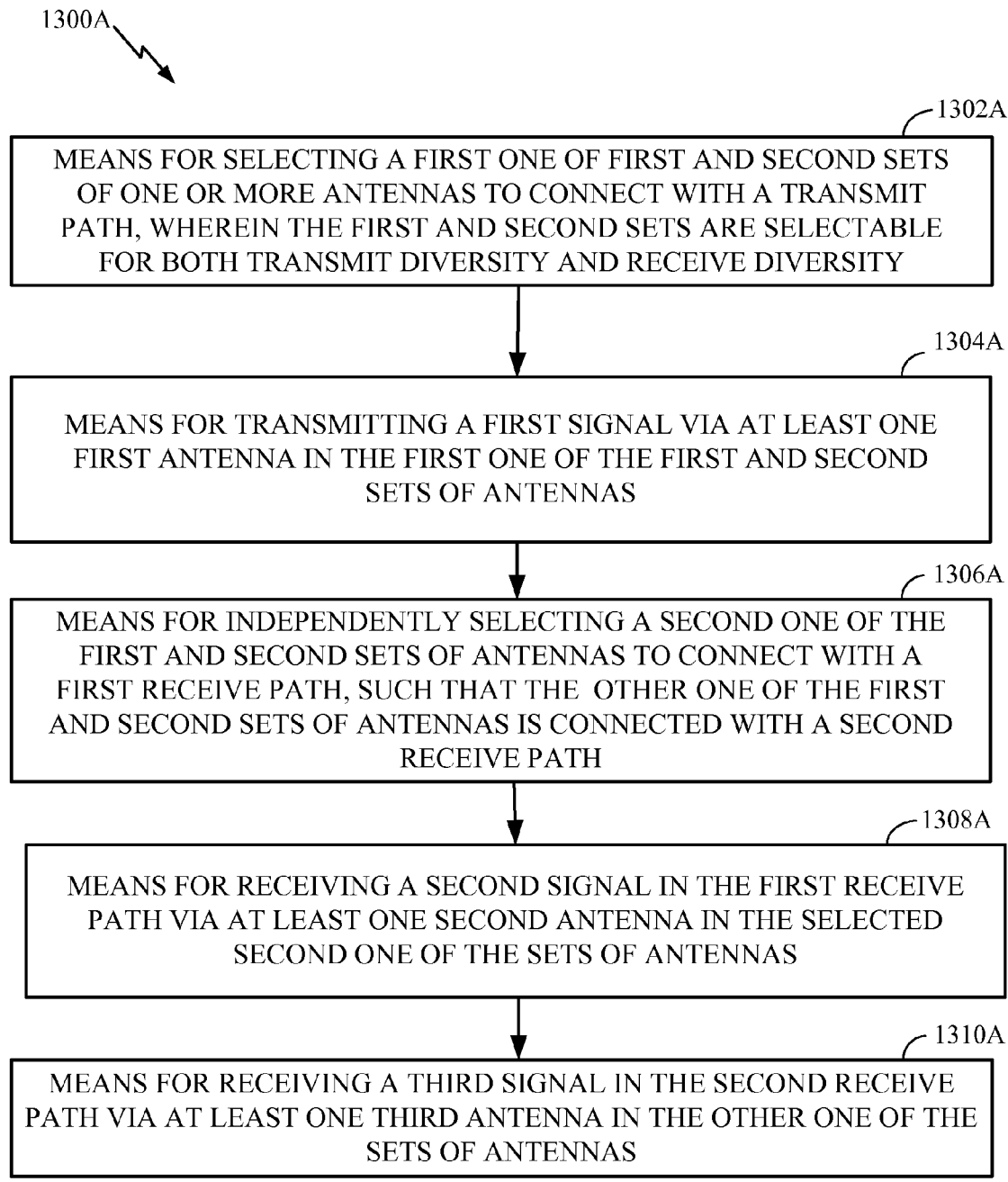
FIG. 13A illustrates example means for performing the operations of FIG. 13.

The various operations or methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, blocks 1302 to 1310 in FIG. 13 correspond to blocks 1302A to 1310A illustrated in FIG. 13A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the phrase "at least one of A or B" is meant to include any combination of A and B. In other words, "at least one of A or B" comprises the following sets: [A], [B] and [A, B].

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer-program product for performing the operations presented herein. For example, such a computer-program product may comprise a computer-readable medium having instructions stored (and/or encoded) thereon, the instructions being executable by one or more processors to perform the operations described herein. For certain aspects, the computer-program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The techniques provided herein may be utilized in a variety of applications. For certain aspects, the techniques presented herein may be incorporated in an access point station, an access terminal, a mobile handset, or other type of wireless device with processing logic and elements to perform the techniques provided herein.

While the foregoing is directed to aspects of the present disclosure, other and further aspects of the disclosure may be devised without departing from the basic scope thereof, and the scope thereof is determined by the claims that follow.

The invention claimed is:

1. A method for wireless communication, comprising:
   selecting a first one of first and second sets of one or more antennas to connect with a transmit path, wherein the first and second sets are selectable for both receive diversity and antenna switched transmit diversity;
   transmitting a first signal via at least one first antenna in the first one of the first and second sets of antennas;
   selecting a second one of the first and second sets of antennas to connect with a first receive path, such that the other one of the first and second sets of antennas is connected with a second receive path;
   receiving a second signal in the first receive path via at least one second antenna in the selected second one of the sets of antennas; and
   receiving a third signal in the second receive path via at least one third antenna in the other one of the sets of antennas.

2. The method of claim 1, wherein the first one of the sets of antennas is the same as the second one of the sets of antennas and is different from the other one of the sets of antennas.

3. The method of claim 2, wherein the at least one first antenna is the same as the at least one second antenna.

4. The method of claim 1, wherein the first one of the sets of antennas is the same as the other one of the sets of antennas and is different from the second one of the sets of antennas.

5. The method of claim 1, wherein the at least one first antenna is different from the at least one third antenna.

6. The method of claim 1, wherein selecting the second one of the sets of antennas comprises selecting between configurations of a cross switch, wherein the configurations comprise a parallel configuration and a cross configuration.

7. The method of claim 6, wherein in the parallel configuration, the cross switch connects the first set of antennas with the first receive path and connects the second set of antennas with the second receive path.

8. The method of claim 7, wherein in the parallel configuration, the cross switch connects the first set of antennas with the transmit path.

9. The method of claim 8, wherein receiving the second signal comprises receiving the second signal in the first receive path via a duplexer coupled between the transmit path and the cross switch.

10. The method of claim 6, wherein in the cross configuration, the cross switch connects the second set of antennas with the first receive path and connects the first set of antennas with the second receive path.

11. The method of claim 1, further comprising:
    operating the first receive path to receive and process signals from the at least one second antenna, wherein the second receive path is deactivated;
    activating the deactivated second receive path;
    determining at least one first metric based on signals received in the first receive path via the at least one second antenna and at least one second metric based on signals received in the activated second receive path via the at least one third antenna;
    if the second metric is better than the first metric, deactivating the first receive path and operating the second receive path to process the signals received from the at least one third antenna; and
    if the second metric is not better than the first metric, deactivating the second receive path.

12. The method of claim 11, wherein the at least one second antenna comprises a fourth antenna and a fifth antenna such that determining the second metric comprises at least one of:
    determining the second metric based on the signals received from the fourth antenna;
    determining the second metric based on the signals received from the fifth antenna; and
    determining the second metric based on a combination of the signals received from the fourth and fifth antennas.

13. The method of claim 11, wherein operating the second receive path comprises processing the signals received in the second receive path without a reception discontinuity between operating the first receive path and operating the second receive path.

14. The method of claim 11, wherein activating the deactivated second receive path comprises activating the deactivated second receive path while operating the first receive path.

15. The method of claim 1, further comprising:
    after receiving the second signal in the first receive path, selecting the second one of the sets of antennas to connect with the second receive path;
    receiving a fourth signal in the second receive path via the selected second one of the sets of antennas; and
    performing baseband switching such that after digitizing the fourth signal in the second receive path, the digitized fourth signal is processed in a baseband portion of the first receive path.

16. The method of claim 15, wherein the baseband portion of the first receive path has converged before performing the baseband switching.

17. An apparatus for wireless communication, comprising:
    at least one processor configured to select a first one of first and second sets of one or more antennas to connect with a transmit path, wherein the first and second sets are selectable for both receive diversity and antenna switched transmit diversity;
    a transmitter configured to transmit a first signal via at least one first antenna in the first one of the first and second sets of antennas, wherein the at least one processor is configured to select a second one of the first and second sets of antennas to connect with a first receive path, such that the other one of the first and second sets of antennas is connected with a second receive path; and
    a receiver configured to receive a second signal in the first receive path via at least one second antenna in the selected second one of the sets of antennas and to receive a third signal in the second receive path via at least one third antenna in the other one of the sets of antennas.

18. The apparatus of claim 17, wherein the first one of the sets of antennas is the same as the second one of the sets of antennas and is different from the other one of the sets of antennas.

19. The apparatus of claim 18, wherein the at least one first antenna is the same as the at least one second antenna.

20. The apparatus of claim 17, wherein the first one of the sets of antennas is the same as the other one of the sets of antennas and is different from the second one of the sets of antennas.

21. The apparatus of claim 17, wherein the at least one first antenna is different from the at least one third antenna.

22. The apparatus of claim 17, wherein the at least one processor is configured to select the second one of the sets of antennas by selecting between configurations of a cross switch, wherein the configurations comprise a parallel configuration and a cross configuration.

23. The apparatus of claim 22, wherein in the parallel configuration, the cross switch connects the first set of antennas with the first receive path and connects the second set of antennas with the second receive path.

24. The apparatus of claim 23, wherein in the parallel configuration, the cross switch connects the first set of antennas with the transmit path.

25. The apparatus of claim 24, wherein the receiver is configured to receive the second signal by receiving the second signal in the first receive path via a duplexer coupled between the transmit path and the cross switch.

26. The apparatus of claim 22, wherein in the cross configuration, the cross switch connects the second set of antennas with the first receive path and connects the first set of antennas with the second receive path.

27. The apparatus of claim 17, wherein the at least one processor is configured to:
operate the first receive path to receive and process signals from the at least one second antenna, wherein the second receive path is deactivated;
activate the deactivated second receive path;
determine at least one first metric based on signals received in the first receive path via the at least one second antenna and at least one second metric based on signals received in the activated second receive path via the at least one third antenna;
if the second metric is better than the first metric, deactivate the first receive path and operating the second receive path to process the signals received from the at least one third antenna; and
if the second metric is not better than the first metric, deactivate the second receive path.

28. The apparatus of claim 27, wherein the at least one second antenna comprises a fourth antenna and a fifth antenna such that the at least one processor is configured to determine the second metric by at least one of:
determining the second metric based on the signals received from the fourth antenna;
determining the second metric based on the signals received from the fifth antenna; and
determining the second metric based on a combination of the signals received from the fourth and fifth antennas.

29. The apparatus of claim 27, wherein the at least one processor is configured to operate the second receive path by processing the signals received in the second receive path without a reception discontinuity between operating the first receive path and operating the second receive path.

30. The apparatus of claim 27, wherein the at least one processor is configured to activate the deactivated second receive path by activating the deactivated second receive path while operating the first receive path.

31. The apparatus of claim 17, wherein the at least one processor is configured to:
select, after receiving the second signal in the first receive path, the second one of the sets of antennas to connect with the second receive path, wherein the receiver is configured to receive a fourth signal in the second receive path via the selected second one of the sets of antennas; and
perform baseband switching such that after digitizing the fourth signal in the second receive path, the digitized fourth signal is processed in a baseband portion of the first receive path.

32. The apparatus of claim 31, wherein the baseband portion of the first receive path has converged before performing the baseband switching.

33. An apparatus for wireless communication, comprising:
means for selecting a first one of first and second sets of one or more antennas to connect with a transmit path, wherein the first and second sets are selectable for both receive diversity and antenna switched transmit diversity;
means for transmitting a first signal via at least one first antenna in the first one of the first and second sets of antennas;
means for selecting a second one of the first and second sets of antennas to connect with a first receive path, such that the other one of the first and second sets of antennas is connected with a second receive path;
means for receiving a second signal in the first receive path via at least one second antenna in the selected second one of the sets of antennas; and
means for receiving a third signal in the second receive path via at least one third antenna in the other one of the sets of antennas.

34. The apparatus of claim 33, wherein the first one of the sets of antennas is the same as the second one of the sets of antennas and is different from the other one of the sets of antennas.

35. The apparatus of claim 34, wherein the at least one first antenna is the same as the at least one second antenna.

36. The apparatus of claim 33, wherein the first one of the sets of antennas is the same as the other one of the sets of antennas and is different from the second one of the sets of antennas.

37. The apparatus of claim 33, wherein the at least one first antenna is different from the at least one third antenna.

38. The apparatus of claim 33, wherein the means for selecting the second one of the sets of antennas is configured to select between configurations of a cross switch, wherein the configurations comprise a parallel configuration and a cross configuration.

39. The apparatus of claim 38, wherein in the parallel configuration, the cross switch connects the first set of antennas with the first receive path and connects the second set of antennas with the second receive path.

40. The apparatus of claim 39, wherein in the parallel configuration, the cross switch connects the first set of antennas with the transmit path.

41. The apparatus of claim 40, wherein the means for receiving the second signal is configured to receive the second signal in the first receive path via a duplexer coupled between the transmit path and the cross switch.

42. The apparatus of claim 38, wherein in the cross configuration, the cross switch connects the second set of antennas with the first receive path and connects the first set of antennas with the second receive path.

43. The apparatus of claim 33, further comprising:
means for operating the first receive path to receive and process signals from the at least one second antenna, wherein the second receive path is deactivated;
means for activating the deactivated second receive path;
means for determining at least one first metric based on signals received in the first receive path via the at least one second antenna and at least one second metric based on signals received in the activated second receive path via the at least one third antenna;
means for deactivating the first receive path and operating the second receive path to process the signals received from the at least one third antenna, if the second metric is better than the first metric; and means for deactivating the second receive path, if the second metric is not better than the first metric.

44. The apparatus of claim 43, wherein the at least one second antenna comprises a fourth antenna and a fifth antenna such that the means for determining the second metric is configured to determine the second metric by at least one of:
determining the second metric based on the signals received from the fourth antenna;
determining the second metric based on the signals received from the fifth antenna; and
determining the second metric based on a combination of the signals received from the fourth and fifth antennas.

45. The apparatus of claim 43, wherein the means for operating the second receive path is configured to process the signals received in the second receive path without a reception discontinuity between operating the first receive path and operating the second receive path.

46. The apparatus of claim 43, wherein the means for activating the deactivated second receive path is configured to activate the deactivated second receive path while operating the first receive path.

47. The apparatus of claim 33, further comprising:
means for selecting the second one of the sets of antennas to connect with the second receive path, after receiving the second signal in the first receive path;
means for receiving a fourth signal in the second receive path via the selected second one of the sets of antennas; and
means for performing baseband switching such that after digitizing the fourth signal in the second receive path, the digitized fourth signal is processed in a baseband portion of the first receive path.

48. The apparatus of claim 47, wherein the baseband portion of the first receive path has converged before performing the baseband switching.

49. A computer-program product for wireless communications, comprising a non-transitory computer-readable medium having instructions stored thereon, the instructions being executable by one or more processors and the instructions comprising:
instructions for selecting a first one of first and second sets of one or more antennas to connect with a transmit path, wherein the first and second sets are selectable for both receive diversity and antenna switched transmit diversity;
instructions for transmitting a first signal via at least one first antenna in the first one of the first and second sets of antennas;
instructions for selecting a second one of the first and second sets of antennas to connect with a first receive path, such that the other one of the first and second sets of antennas is connected with a second receive path;
instructions for receiving a second signal in the first receive path via at least one second antenna in the selected second one of the sets of antennas; and
instructions for receiving a third signal in the second receive path via at least one third antenna in the other one of the sets of antennas.

50. The computer-program product of claim 49, wherein the first one of the sets of antennas is the same as the second one of the sets of antennas and is different from the other one of the sets of antennas.

51. The computer-program product of claim 50, wherein the at least one first antenna is the same as the at least one second antenna.

52. The computer-program product of claim 49, wherein the first one of the sets of antennas is the same as the other one of the sets of antennas and is different from the second one of the sets of antennas.

53. The computer-program product of claim 49, wherein the at least one first antenna is different from the at least one third antenna.

54. The computer-program product of claim 49, wherein selecting the second one of the sets of antennas comprises selecting between configurations of a cross switch, wherein the configurations comprise a parallel configuration and a cross configuration.

55. The computer-program product of claim 54, wherein in the parallel configuration, the cross switch connects the first set of antennas with the first receive path and connects the second set of antennas with the second receive path.

56. The computer-program product of claim 55, wherein in the parallel configuration, the cross switch connects the first set of antennas with the transmit path.

57. The computer-program product of claim 56, wherein receiving the second signal comprises receiving the second signal in the first receive path via a duplexer coupled between the transmit path and the cross switch.

58. The computer-program product of claim 54, wherein in the cross configuration, the cross switch connects the second set of antennas with the first receive path and connects the first set of antennas with the second receive path.

59. The computer-program product of claim 49, further comprising:
operating the first receive path to receive and process signals from the at least one second antenna, wherein the second receive path is deactivated;
activating the deactivated second receive path;
determining at least one first metric based on signals received in the first receive path via the at least one second antenna and at least one second metric based on signals received in the activated second receive path via the at least one third antenna;
if the second metric is better than the first metric, deactivating the first receive path and operating the second receive path to process the signals received from the at least one third antenna; and
if the second metric is not better than the first metric, deactivating the second receive path.

60. The computer-program product of claim 59, wherein the at least one second antenna comprises a fourth antenna and a fifth antenna such that determining the second metric comprises at least one of:
determining the second metric based on the signals received from the fourth antenna;
determining the second metric based on the signals received from the fifth antenna; and
determining the second metric based on a combination of the signals received from the fourth and fifth antennas.

61. The computer-program product of claim 59, wherein operating the second receive path comprises processing the signals received in the second receive path without a reception discontinuity between operating the first receive path and operating the second receive path.

62. The computer-program product of claim 59, wherein activating the deactivated second receive path comprises activating the deactivated second receive path while operating the first receive path.

63. The computer-program product of claim 49, further comprising:

after receiving the second signal in the first receive path, selecting the second one of the sets of antennas to connect with the second receive path;

receiving a fourth signal in the second receive path via the selected second one of the sets of antennas; and performing baseband switching such that after digitizing the fourth signal in the second receive path, the digitized fourth signal is processed in a baseband portion of the first receive path.

64. The computer-program product of claim 63, wherein the baseband portion of the first receive path has converged before performing the baseband switching.

* * * * *